United States Patent
Barbas

(10) Patent No.: US 9,971,905 B2
(45) Date of Patent: May 15, 2018

(54) ADAPTIVE ACCESS CONTROL IN RELATIONAL DATABASE MANAGEMENT SYSTEMS

(71) Applicant: International Business Machines Corporation, Armonk, NY (US)

(72) Inventor: Pedro M. Barbas, Dunboyne (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 264 days.

(21) Appl. No.: 14/618,200

(22) Filed: Feb. 10, 2015

(65) Prior Publication Data

US 2015/0227756 A1   Aug. 13, 2015

(30) Foreign Application Priority Data

Feb. 11, 2014 (GB) .................................. 1402292.5

(51) Int. Cl.
*G06F 17/30* (2006.01)
*G06F 21/62* (2013.01)
*G06F 21/60* (2013.01)

(52) U.S. Cl.
CPC .... *G06F 21/6227* (2013.01); *G06F 17/30522* (2013.01); *G06F 17/30867* (2013.01); *G06F 21/604* (2013.01); *G06F 2221/2141* (2013.01)

(58) Field of Classification Search
CPC ......... G06F 21/6227; G06F 2221/2141; G06F 17/30522; G06F 17/30867; G06F 21/604
USPC ................. 707/783, 694, 781, 785, 786, 787
See application file for complete search history.

(56) References Cited

U.S. PATENT DOCUMENTS

| 6,209,344 | B1 | 4/2001 | Mahajan |
| 2,030,191 | A1 | 10/2003 | Choy |
| 7,346,617 | B2 | 3/2008 | Wong |
| 7,464,072 | B1 * | 12/2008 | Subramaniam ... G06F 17/30392 707/999.003 |
| 7,599,937 | B2 | 10/2009 | Dutta et al. |
| 7,865,521 | B2 * | 1/2011 | Bird ..................... G06F 21/6227 707/781 |

(Continued)

FOREIGN PATENT DOCUMENTS

WO   2011147887 A1   12/2011

OTHER PUBLICATIONS

Agrawal et al. " Hippocratic Databases," Proceedings of the 28th VLDB Conference, Hong Kong, China, 2002, 12 pgs.

(Continued)

*Primary Examiner* — Dangelino Gortayo
(74) *Attorney, Agent, or Firm* — Cantor Colburn LLP

(57) ABSTRACT

One embodiment is a system for implementing context-aware access control of data in a relational database system. The system includes a memory having computer readable instructions and one or more processors for executing the computer readable instructions. According to the computer readable instructions, a request is received to access one or more tables of a database. Further according to the computer readable instructions, a context-aware access control, defined for at least a portion of the one or more tables, is identified. It is verified that the context-aware access control is satisfied. Access to the at least a portion of the one or more tables is permitted, responsive to verifying that the context-aware access control is satisfied.

20 Claims, 7 Drawing Sheets

(56) References Cited

U.S. PATENT DOCUMENTS

| | | | | |
|---|---|---|---|---|
| 7,873,660 B1* | 1/2011 | Wong | G06F 21/6245 | 707/705 |
| 8,078,595 B2* | 12/2011 | King | G06F 21/6227 | 707/694 |
| 8,306,999 B2* | 11/2012 | Gass, III | G06F 21/6227 | 707/781 |
| 8,478,713 B2 | 7/2013 | Cotner et al. | | |
| 8,566,909 B2 | 10/2013 | Yalamanchi | | |
| 8,775,468 B2 | 7/2014 | Hada et al. | | |
| 8,955,038 B2* | 2/2015 | Nicodemus | G06F 21/55 | 717/172 |
| 9,037,610 B2* | 5/2015 | Rissanen | G06F 21/6227 | 707/785 |
| 2006/0117004 A1* | 6/2006 | Hunt | G06F 21/566 | 707/999.006 |
| 2010/0262625 A1 | 10/2010 | Pittenger | | |

OTHER PUBLICATIONS

Disclosed Anonymously, "System Design and architecture for mapping multiple and independent security context based access control in a RDBMS Engine", IP.com 000223773, Nov. 29, 2012, 7 pgs.

Kenneth K. Pang, "Fine-grained event-based access control", Massachusetts Institute of Technology. Dept. of Electrical Engineering and Computer Science, Massachusetts Institute of Technology, 1998, 46 pgs.

LeFevre et al. "Limiting disclosure in Hippocratic databases", in VLDB, 2004 10 pgs.

Oracle® Database Security Guide 10g Release 2 (10.2) B14266-09, "Implementing Application Context and Fine-Grained Access Control", Jul. 2012, 53 pgs.

W3C, [online]; [retrieved on Jan. 13, 2015]; retrieved from the Internet http://www.w3.org/TR/P3P/; "The Platform for Privacy Preferences 1.0 (P3P1.0) Specification," 67 pgs.

* cited by examiner

| CREATE CONTEXT | context-name |
|---|---|
| ON TABLE | table-name |
| FOR COLUMNS | columns-name |
| ATTRIBUTES | (table-name:attribute, table-name:attribute, ...) |
| FOR PURPOSE | purpose-name |
| FOR RECIPIENT | recipient-authorization-name |
| ENABLE | |

Fig. 5A

| CREATE CONTEXT | Patient-Emergency |
|---|---|
| ON TABLE | Patients |
| FOR COLUMNS | ALL |
| ATTRIBUTES | (PhysicianShift:Location_Id, PhysicianShift:Datetime) |
| FOR PURPOSE | Patients |
| FOR RECIPIENT | Physicians |
| ENABLE | |

Fig. 5B

ADAPTIVE ACCESS CONTROL IN RELATIONAL DATABASE MANAGEMENT SYSTEMS

FOREIGN PRIORITY

This application claims priority to United Kingdom Application No. 1402292.5, filed 11 Feb. 2014, and all the benefits accruing therefrom under 35 U.S.C. § 119, the contents of which in its entirety are herein incorporated by reference.

BACKGROUND

Embodiments of this disclosure relate to the field of database management systems and, more particularly, to adaptive access control in relational database management systems (RDBMSs).

Due to both legal and business reasons, business enterprises are increasingly becoming sensitive to data security. Many RDBMSs implement discretionary access controls (DACs) for granting table object access privileges to a user. These privileges may be managed by role-based access controls (RBACs), where a user wishing to access data in a table object must be a member of a role permitted to access the data in the table object. Another technique for controlling access to data in a table on a column-level or a row-level includes use of label-based access controls (LBACs), such that, unless a label of a user is compatible with a label associated with a row or column of a table, then the data for that row or column is not returned to the user. Due to the restrictive nature of label components, business enterprises have turned to more flexible mechanisms, for example, fine-grained access controls (FGACs), including views, triggers, virtual private databases, and row and column access controls.

SUMMARY

One embodiment is a system for implementing context-aware access control of data in a relational database system. The system includes a memory having computer readable instructions and one or more processors for executing the computer readable instructions. According to the computer readable instructions, a request is received to access one or more tables of a database. Further according to the computer readable instructions, a context-aware access control, defined for at least a portion of the one or more tables, is identified. It is verified that the context-aware access control is satisfied. Access to the at least a portion of the one or more tables is permitted, responsive to verifying that the context-aware access control is satisfied.

Another embodiment is a computer-implemented method for context-aware access control of data in a relational database system. The method includes receiving a request to access one or more tables of a database. A context-aware access control, defined for at least a portion of the one or more tables, is identified. It is verified that the context-aware access control is satisfied. Access to the at least a portion of the one or more tables is permitted, responsive to verifying that the context-aware access control is satisfied.

Yet another embodiment is a computer program product for context-aware access control of data in a relational database system. The computer program product includes a computer readable storage medium having program instructions embodied therewith. The program instructions are executable by a processor to cause the processor to perform a method. The method includes receiving a request to access one or more tables of a database. Further according to the method, a context-aware access control, defined for at least a portion of the one or more tables, is identified. It is verified that the context-aware access control is satisfied. Access to the at least a portion of the one or more tables is permitted, responsive to verifying that the context-aware access control is satisfied.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIGS. 5A-5B are example database access request actions, labels, and corresponding code examples, according to some embodiments of this disclosure.

DETAILED DESCRIPTION

Conventional solutions to access control problems are built on static DAC, RBAC, LBAC and FGAC models and do not address the intricate security requirements of business enterprises, which require dynamic authorization enforcement and flexible context-aware access control. In conventional systems, security solutions are created, administered, and enforced through static access control rules present within the database system. But these database systems are unable to take into account the dynamic state changes in which data is being accessed.

In a medical example, a particular primary care physician is permitted to view patient information only for his own patients. However, when this physician is working in an intensive care unit, it is desirable for him to be able to see patient information for all patients currently admitted to the intensive care unit. It is impossible to know beforehand what patients will be admitted to the intensive care unit, and conventional systems fail to adjust the security solution accordingly.

For another example, if a particular patient is being transported to a hospital in an ambulance, then it is desirable for the paramedic who is taking care of the patient in the ambulance to be allowed to view the patient's information.

Figure 1:
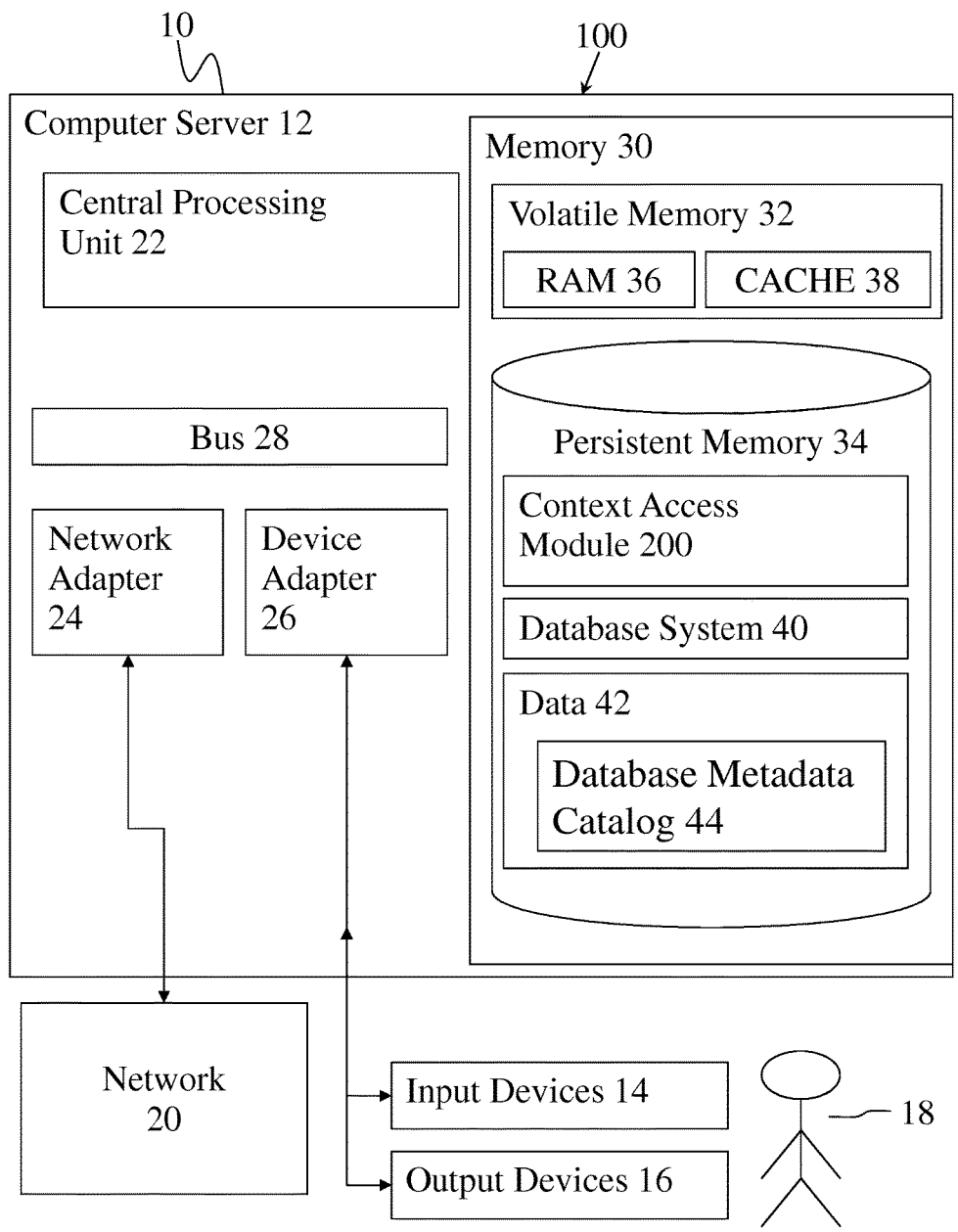
FIG. 1 is a block diagram of an adaptive access control system deployed in a computer processing system, according to some embodiments of this disclosure.

FIG. 1 is a block diagram of an adaptive access control system 100 deployed on a computer processing system 10, according to some embodiments of this disclosure. Adaptive access control system 100 is operational with numerous other general purpose or special purpose computing system environments or configurations. Examples of well-known computing processing systems, environments, and configurations that may be suitable for use with computer processing system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer processing system 10 may be described in the general context of computer readable instructions, such as program modules, being executed by a computer processor. Generally, program modules may include routines, programs, objects, components, logic, and data structures that perform particular tasks or implement particular abstract data types. Computer processing system 10 may be embodied in distributed cloud computing environments where tasks are performed by remote processing devices that are linked through a communications network. In a distributed cloud computing environment, program modules may be located in both local and remote computer system storage media, including memory storage devices.

Computer processing system 10 includes general-purpose computer server 12 and one or more input devices 14 and output devices 16 directly attached to the computer server 12. Computer processing system 10 is connected to a network 20. Computer processing system 10 communicates with a user 18 using input devices 14 and output devices 16. Input devices 14 include one or more of a keyboard, a scanner, a mouse, a trackball, and other pointing devices. Output devices 16 include one or more of a display and a printer. Computer processing system 10 communicates with network devices (not shown) over network 20. Network 20 can be a local area network (LAN), a wide area network (WAN), or the Internet.

Computer server 12 includes central processing unit (CPU) 22, network adapter 24, device adapter 26, bus 28 and memory 30.

CPU 22 loads machine instructions from memory 30 and performs machine operations in response to the instructions. Such machine operations include, for example, incrementing or decrementing a value in a register, transferring a value from memory 30 to a register or vice versa, branching to a different location in memory if a condition is true or false (also known as a conditional branch instruction), and adding or subtracting the values in two different registers and loading the result in another register. A typical CPU can perform many different machine operations. A set of machine instructions is called a machine code program, the machine instructions are written in a machine code language, which is referred to a low level language. A computer program written in a high level language needs to be compiled to a machine code program before it can be run. Alternatively a machine code program such as a virtual machine or an interpreter can interpret a high level language in terms of machine operations.

Network adapter 24 is connected to bus 28 and network 20 for enabling communication between the computer server 12 and network devices.

Device adapter 26 is connected to bus 28, input devices 14, and output devices 16 for enabling communication between computer server 12, input devices 14, and output devices 16.

Bus 28 couples the main system components together, including memory 30, to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 are random access memory (RAM) 36 and cache memory 38. Generally, volatile memory is used because it is faster, and generally, non-volatile memory is used because it will hold the data for longer. Computer processing system 10 may further include other removable or non-removable, volatile or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided, including an external port for removable, non-volatile solid-state memory; and an optical disk drive for reading from or writing to a removable, non-volatile optical disk such as a compact disk (CD), digital video disk (DVD), or Blu-ray. In such instances, each can be connected to bus 28 by one or more data media interfaces. As will be further depicted and described below, memory 30 may include at least one program product having a set (i.e., at least one) of program modules that are configured to carry out the functions of embodiments of this disclosure.

Deployed on the computer processing system 100, the adaptive access control system 100 may include a set of the program modules configured to carry out the functions of this disclosure, including content access module 200, database system 40, data 42, and a database metadata catalog 44. Further program modules that support the adaptive access control system 100 but are not shown include firmware, a boot strap program, an operating system, and support applications. Each of the operating system, support applications, other program modules, and program data, or some combination thereof, may include an implementation of a networking environment.

Computer processing system 10 communicates with at least one network 20 (e.g., a local area network (LAN), a general wide area network (WAN), or a public network like the Internet) via network adapter 24. Network adapter 24 communicates with the other components of computer server 12 via bus 28. It should be understood that, although not shown, other hardware or software components could be used in conjunction with computer processing system 10. Examples include, but are not limited to, microcode, device drivers, redundant processing units, external disk drive arrays, redundant array of independent disks (RAID), tape drives, and data archival storage systems.

Figure 2:
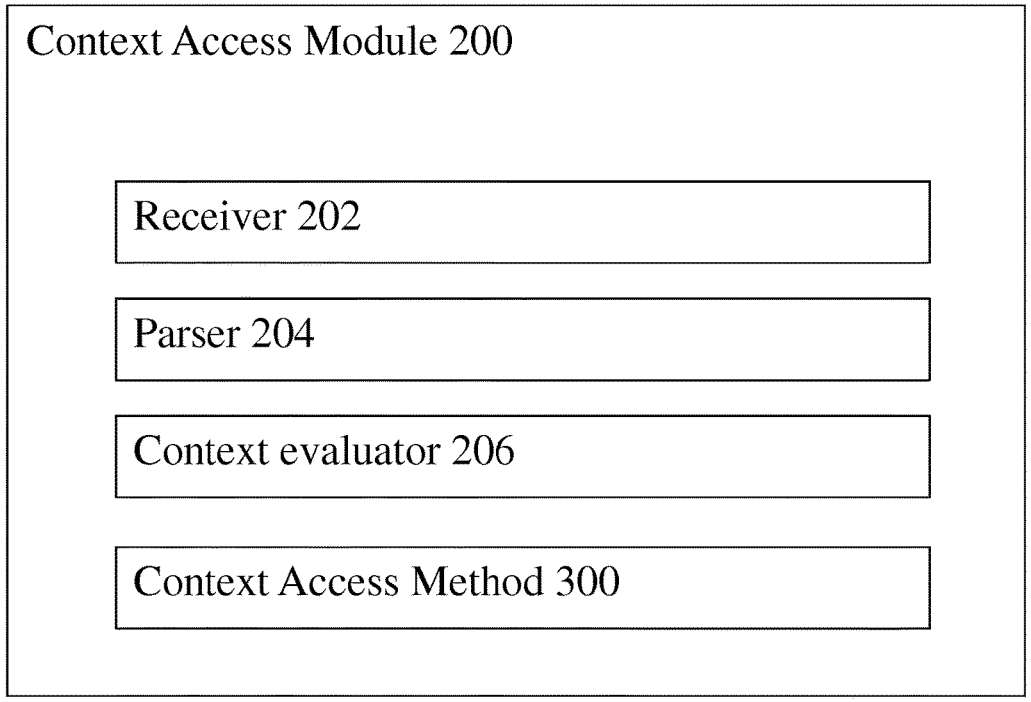
FIG. 2 is a block diagram of components of the adaptive access control system, according to some embodiments of this disclosure.

FIG. 2 is a block diagram of components of the adaptive access control system 100, according to some embodiments. By way of context access module 200, the adaptive access control system 100 implements context-aware access control to data in a table of a relational database system. The context may be in relation to a user or a role performed by the user. Context access module 200 includes receiver 202, parser 204, context evaluator 206, and context access method 300.

Receiver 202 is for receiving a user SQL query after a user requests access to a table using a SQL query.

Parser 204 is for splitting the query into several components preceding compilation and for transforming the components in a compiler definition.

Context evaluator 206 is for validating if any context-aware access control has been configured for any table references. If a context-aware access control is configured, then context evaluator 206 evaluates whether the context references any tables from the current SQL query. This evaluation is based on a validation of defined table-based attributes with the purpose of the context. The context-aware access request is applied to the SQL query if the validation matches the attributes with the purpose of the context. After all validations for the table have been processed, context evaluator 206 creates a pseudo-view object using the table columns configured in the context. After all tables have been evaluated for context-aware access control permissions and the resultant pseudo-view is created, context evaluator 206 enforces the result instead of the original internal SQL query representation. The result is presented to the user.

Figure 3A:
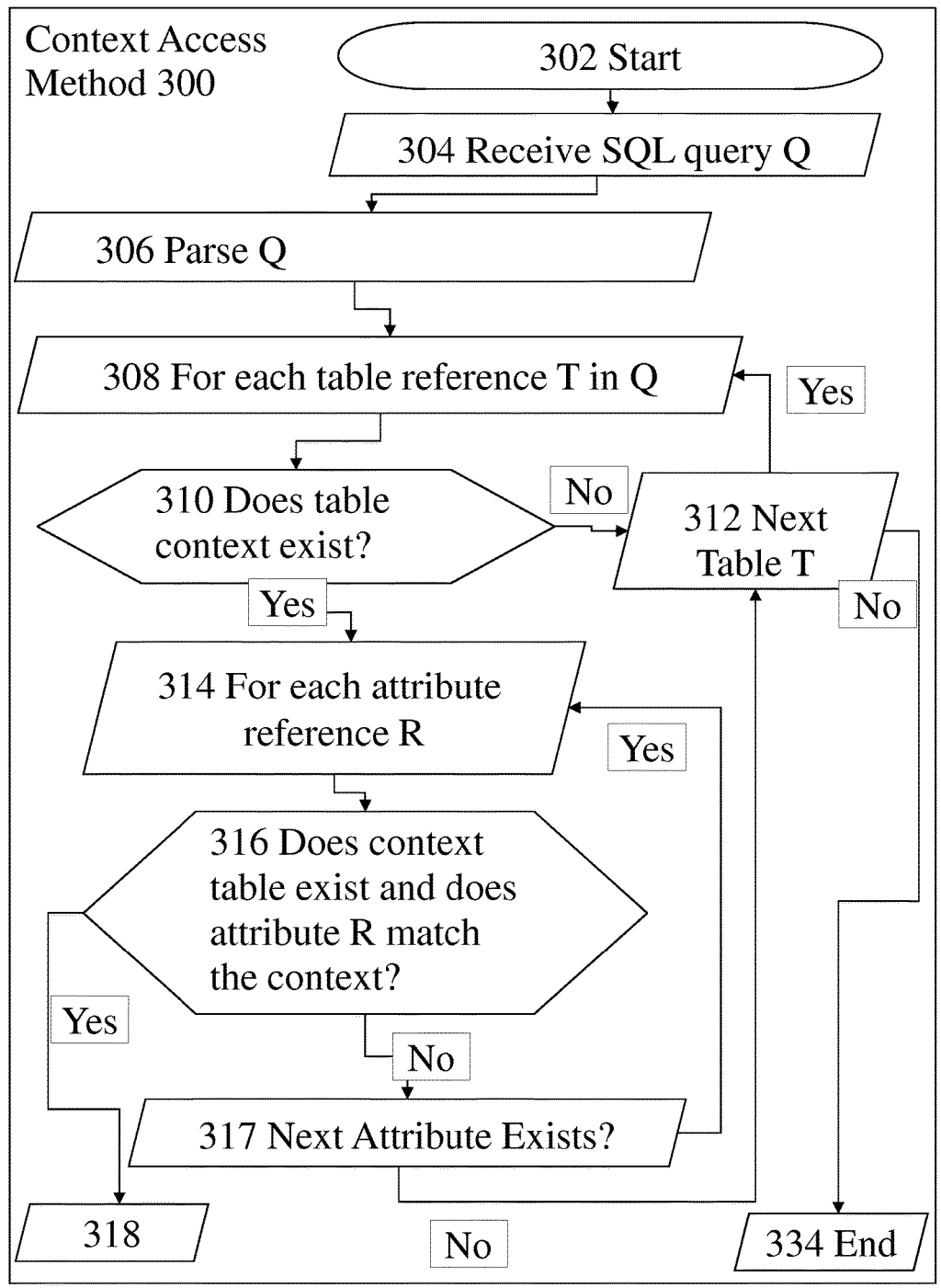
FIGS. 3A-3B together depict a flow diagram of a method for adaptive access control, according to some embodiments of this disclosure.
Figure 3B:
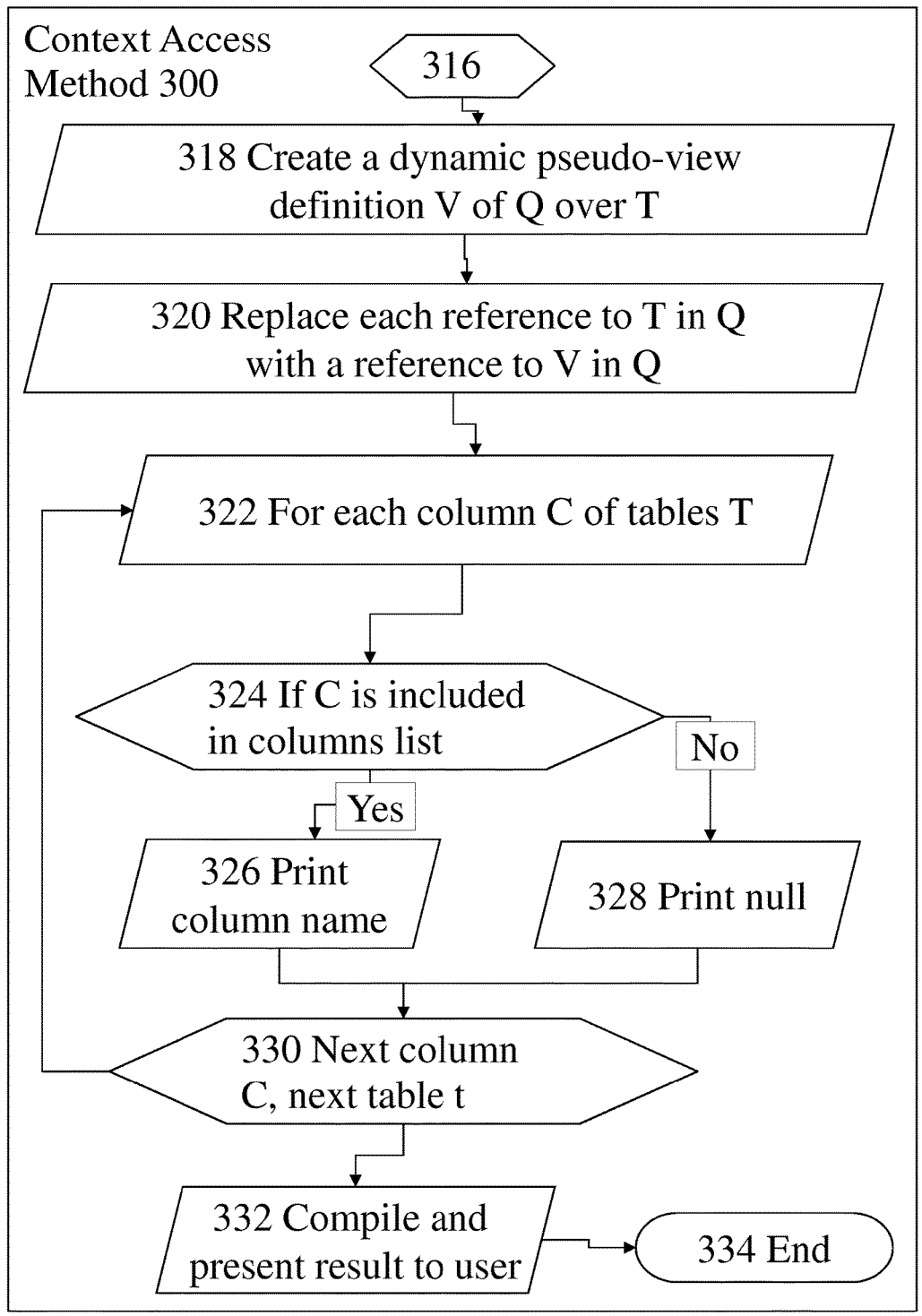

FIGS. 3A-3B are a flow diagram of a context access method 300 for performing a method of the adaptive access control system 100, thereby controlling the context access module 200, according to some embodiments of this disclosure.

Referring to FIGS. 3A and 3B, context access method 300 comprises logical process blocks 302 to 334.

Block 302 is the start of context access method 300.

Block 304 is for receiving a SQL query called Q. When a user of a database management system tries to access a table using a SQL query, a SQL compiler receives the SQL query and relevant environment information, for example, a default session user name.

Block 306 is for parsing query Q. Parser 204 splits the SQL query into two or more components and converts them into an internal representation.

Block 308 is a loop defining each table reference t in the SQL query Q.

Block 310 is for checking if a context is defined that references any table T (or part of a table) from the current SQL query. Context evaluator 206 accesses database catalogue metadata and validates the check. If no context-aware permission definition exists, then the current security policies on the database remain unmodified and the next table reference in the query is evaluated by looping back to block 308 via block 312. If a context-aware permission is defined, then context access method 300 moves to block 314.

Block 312 is for looping back to block 308 if no context-aware permission is defined or for exiting, at end block 334, if there are no more table references T.

Block 314 is for defining a loop for each attribute reference R in table T attributes.

Block 316 is for determining whether attribute R matches the context and, if so, progressing to block 318. If not, context access method 300 moves to block 317. This determination is performed by context evaluator 206. The determination is evaluated upon a comparison between the defined table based attributes, with the purpose of the context with respect to the recipient list.

Block 317 is for looping back to block 314 for the next attribute. If there are no more attributes, then context access method 300 moves to block 312 for the next table.

As shown in FIG. 3B, block 318 is for creating a view definition table V of Q over T, such that a view object is created. The view is a select statement that references each column defined in the context-aware permission command. Context evaluator 206 then converts the view definition into internal compiler definition and enforces the result instead of the original internal SQL query representation. This way, any policy permissions that are in effect for the specific user are overridden by the context-aware permission access (e.g., LBAC permissions).

Block 320 is for replacing each reference of table T in query Q with a reference to table V.

Block 322 is for defining a loop for each column C of table T.

Block 324 is for branching to block 326 if column C is included in the columns list. Otherwise, context access method 300 moves to block 328.

Block 326 is for printing the column name and continuing at block 330.

Block 328 is for not printing a value or printing a null character and continuing at block 330.

Block 330 is for looping back to block 322 for the next column C, if there is one, or else continuing at block 332.

Block 332 is for compiling the result and presenting it to a user.

Block 334 is the end of context access method 300.

Figure 4:
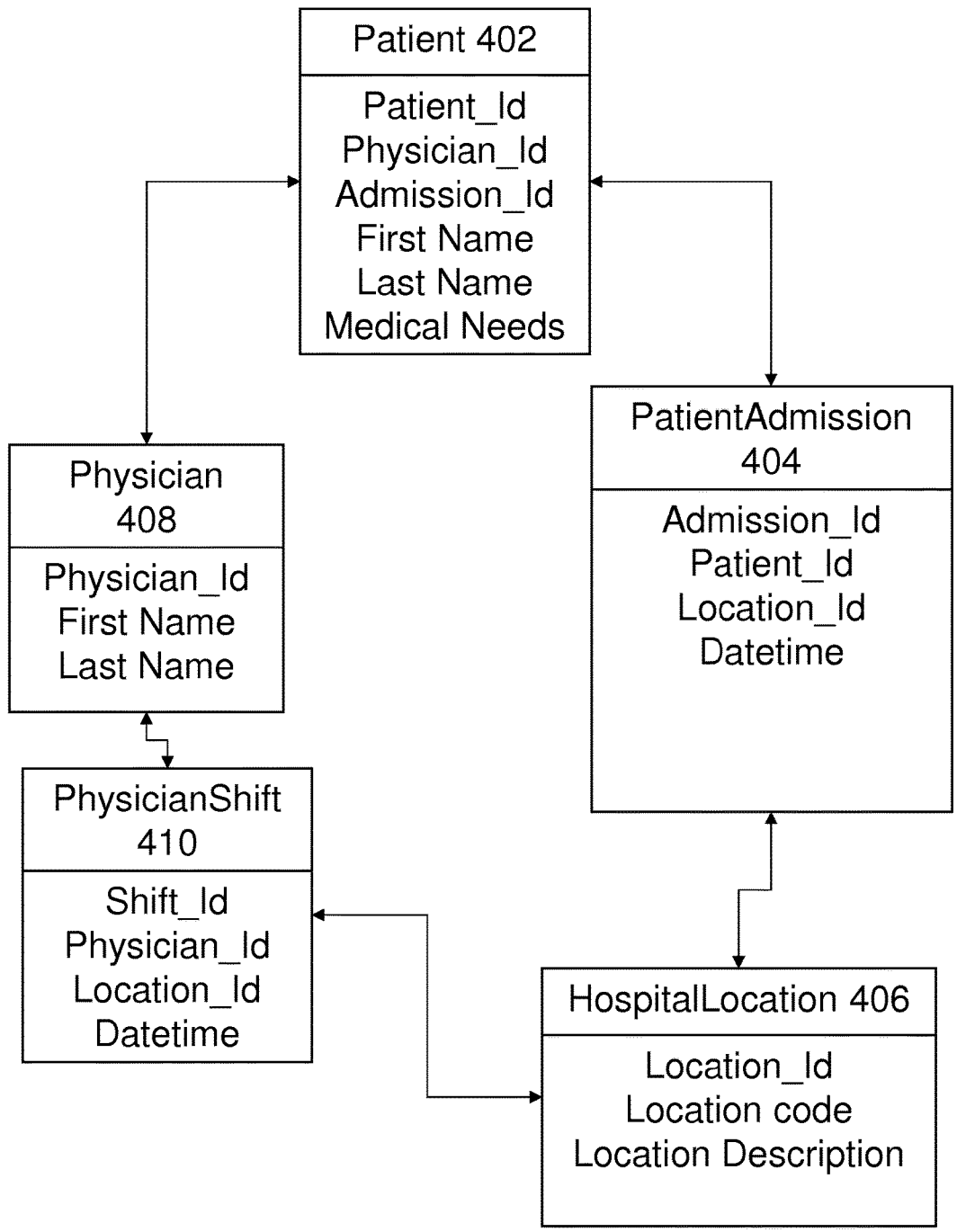
FIG. 4 is an example model for a health system database, upon which the adaptive access system 100 can operate, according to some embodiments of this disclosure.

FIG. 4 is an example model for a health system database, upon which the adaptive access system 100 can operate, according to some embodiments of this disclosure. The health system database model includes patient table 402, patient admission table 404, hospital location table 406, physician table 408, and physician shift table 410.

Patient table 402 includes the following fields: Patients_Id, Physician_Id, Admission_Id, First Name, Last Name, and Medical Needs. Patients_Id is an identifier to identify the patent. Physician_Id is an identifier to identify the physician who normally looks after the patient and who would have normal access to the patient's records. Admission_Id is an identifier that indicates if a patient has been admitted to a hospital. One or more admission identifiers can be on a list when a patient has been admitted to a hospital on multiple occasions. First Name and Last Name are the first and last names of the patient. Medical Needs is a field describing the medical needs of the patient. In conventional systems, only the physician identified in the patient table would have access to the Medical Needs field, or any other entry, for this patient.

PatientAdmission 404 is a table holding a more detailed record for each admission in patient table 402. Conventionally, access is restricted to the identified physician in the corresponding patient table record. The following fields are included: Admission_Id, Patients_Id, Location_Id, and Datetime.

HospitalLocation 406 is a table detailing the location of each hospital for each location in PatientAdmission 404 and also for each location in PhysicianShift 410. The following fields are included: Location_Id, Location code, and Location Description.

Physician 408 is a table holding records for each physician listed in Patient 402. The following fields are included: Physician_Id First Name, and Last Name.

PhysicianShift 408 is a table holding records for each shift that a physician has made, including the following fields: Shift_Id, Physician_Id, Location_Id, and Datetime.

FIGS. 5A-5B together provide an example context-aware control data structure with respective labels and respective values. Context-aware permissions are defined in the database for an object such as a table and are typically stored in a database metadata catalog 44. Context-aware control data structure includes a CREATE CONTEXT field, an ON TABLE field, a FOR COLUMNS field, an ATTRIBUTES field, a FOR PURPOSE field, a FOR RECIPIENT field, and an ENABLE field The CREATE CONTEXT field (e.g., context-name=Patient-Emergency) identifies a context control that operates on columns (e.g., columns-name=ALL) in a table (e.g., table-name=Patients) identified the ON TABLE field and the FOR COLUMNS field for a particular recipient (e.g., recipient-authorization-name=Physicians). The actual context is expressed using the FOR PURPOSE field (e.g., purpose-name=Patients) and the ATTRIBUTES field (e.g., table-name:attribute=PhysicianShift:Location_Id; table-name:attribute=PhysicianShift:Datetime). The ENABLE field enables the context-aware control.

Those in the FOR RECIPIENT field are allowed access to table table-name on columns columns-name. In this context-aware access control example, the context definition is specified using one or more table-name:attribute fields and purpose-name field.

Context-name is unique and cannot be the same as a previous context-aware access control that already exists. In the example of FIG. 5B, the context-name is "Patient-Emergency" in the database example covering patients and emergencies.

Table-name is the name of the table where the context-aware access control has its domain. In the example, the table-name is "Patients".

Columns-name is the name of the column that can be accessed in the context domain. In the example, the value of columns-name is "ALL" signifying that all column names should be accessed in the context domain.

Table-name: attribute is the name of a specific table base attribute, or attributes, that need to be satisfied with the purpose of the context-aware access control. In the example, two attributes are listed, PhysicianShift:Location_Id and PhysicianShift:Datetime.

Purpose-name is the name of the purpose. In the example, "Patients" is the purpose.

Recipient-authorization-name is the name of the recipients that have access to table table-name on columns columns-name. In the example, "Physicians" are listed as the groups that will have access.

Once context-aware permissions are configured on a table, any SQL query that attempts to access that table will have the context imposed on that access.

According to some embodiments, a patient emergency context is defined. The current database model has implemented an access control to define that only the primary care physician of a patient will be able to see the patient's information. In some embodiments, the patient emergency context allows a physician that is working in the intensive care unit to be able to see patient information from all patients admitted in the intensive care unit during the work period only. This occurs in the context of the patient being in an intensive care unit at the same time as a doctor is working in that intensive care unit. In FIG. 5B, the defined context-aware access control states that those in a physician's role, according to the database, are allowed access the table Patients on all columns, if the attributes Location and Datetime are validated in the context Patients.

The context evaluation function accesses the catalogue metadata and the current database model in the following way, for example: (1) For a specific patient, John, the database model indicates that John is in intensive care treatment in an emergency department: Location=Emergency from "Select Location_Id from patients." (2) For a specific physician, Jack, the database model indicates that Location=Emergency from "Select Location_Id from PhysicianShift." (3) Both John and Jack are in the same Datetime interval; that is, Datetime from PhysicianShift matches Datetime from PatientAdmission. (4) For a specific patient, Mark, the database model shows that he is not in intensive care treatment in the emergency department: Location≠Emergency from "Select Location_Id from patients." (5) Both John and Mark have as a primary care physician Joey.

In the above example, suppose Jack issues those two queries: (1) Select 'Medical Needs' from Patients where 'First Name'="John"; (2) Select 'Medical Needs' from Patients where 'First Name'="Mark."

On the first query, when the context evaluation function validates Location and Datetime in the context Patients, Jack will be able to see John's information although Jack is not the John's primary care physician. Likewise, Jack will not be able to see Mark's information as he is not Mark's primary care physician. Although the context-aware permission applies to the table Patients, the context evaluation function does not validate Location.

A recipient Physician record is present on both tables Physician and PhysicianShift for the patient emergency context. Both attributes Location_Id and Datetime from table PhysicianShift need to be evaluated on the purpose of Patients. A patient's record is present on tables Patients and PatientAdmission, and both attributes Location_Id and Datetime from table PatientAdmission need to be validated on the recipient Physician. When attributes Location_Id and Datetime from table PhysicianShift match the attributes Location_Id and Datetime from table PatientAdmission, then the patient emergency context is matched. As a result, if a physician is working in the specific location where a patient is under treatment, where the time frame for the physician is also included in the time frame where a patient is under treatment, then the physician is able to see the patient information. This example is provided merely for illustrative purposes, and many variations can be added with for example the inclusion of different attributes to be validated for the context.

Further embodiments of this disclosure are now described. It will be understood by one of ordinary skill in the art that all or part of the logical processes of the adaptive access control system 100 may be alternatively embodied in a logic apparatus, or a plurality of logic apparatuses, including logic elements arranged to perform the logical processes of the method 300. It will be further understood that such logic elements may include hardware components, firmware components, or a combination thereof.

It will be equally clear to one of skill in the art that all or part of the logic components of the adaptive access control system 100 may be alternatively embodied in a logic apparatus including logic elements to perform the blocks of the method 300, and that such logic elements may include components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, embodiments of this disclosure may be realized in the form of a computer implemented method of deploying a service, including deploying computer program code operable to, when deployed into a computer infrastructure and executed thereon, cause the computer system to perform the method 300.

It will be appreciated that the method and components of the adaptive access control system 100 may alternatively be embodied fully or partially in a parallel computing system comprising two or more processors for executing parallel software.

Figure 6:
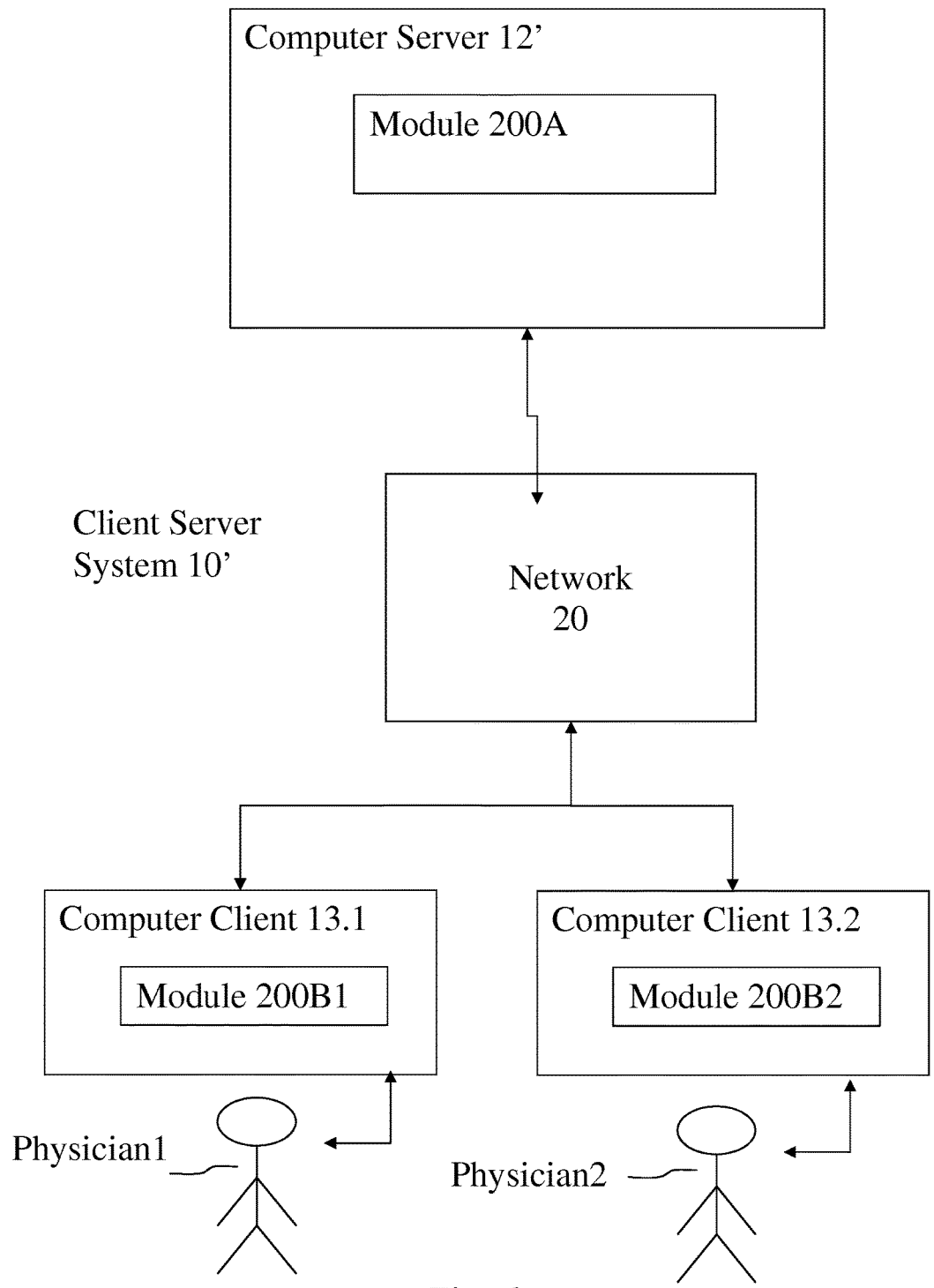
FIG. 6 is a block diagram of a client-server implementation of the adaptive access control system, according to some embodiments of this disclosure.

Referring to FIG. 6, a further alternative embodiment of this disclosure may be realized in the form of a client server system 10' that includes computer server 12' and computer client 13'. Computer server 12' connects to computer clients 13.1 and 13.2 via network 20. Computer clients 13.1 and 13.2 provide computing services to physicians labeled physician1 and physician2. In this client-server embodiment, module 200A is located and processed on computer server 12', whereas client modules 200B1 and 200B2 are located and processed in the computer clients 13.1 and 13.2 respectively. In this client-server embodiment, the method 300 is provided as a service to the clients. In this example, two clients are shown as used by two different physicians, representing a physician that has access to a patient's records at all time and another physician that has access only during an emergency. It will be understood that any number of clients can be utilized, and there may be different types of users, including nurses who also need context-aware access during emergencies and administrators who not need context access.

In a first aspect of the disclosure, there is provided a system for implementing context-aware access control of data in a relational database system including: a receiver for receiving a request to access one or more tables of the database; and a context evaluator for identifying a context-aware access control defined for at least one of the tables, verifying whether the identified context-aware access control is satisfied, and permitting access to the one or more tables based on the identified and verified context-aware access control.

In some embodiments, a database security administrator can define one or more context-aware access controls, and in every query submitted to the database, those same context-aware access controls are validated if they reference any table from the query, for example, an SQL query.

In a second aspect of the disclosure, there is provided a method for implementing context-aware access control of data in a relational database system including: receiving a request to access one or more tables of the database; identifying a context-aware access control defined for at least one of the tables; verifying that the identified context-aware access control is satisfied; and permitting access to the one or more tables based on the identified and verified context-aware access control.

Some embodiments of the adaptive access control system 100 have an effect on queries made outside the database system computer by allowing them to access restricted data not otherwise allowed outside the context. Some embodiments have an effect that operates at a database system level of a computer and below any overlying application level. Further, some embodiments have an effect that results in the database system being made to operate in a new way to allow context access.

In some embodiments, the request does not have access to the one or more tables by virtue of the security level of the request or the originator of the request. Rather, access may be permitted to one or more portions of the tables based on the identified and verified context-aware access control.

Some embodiments may create a view for one of more portions of the table where access is permitted due to the context-aware access control.

Some embodiments may replace each reference to a restricted portion of a table in the request with a reference to the created view of the assessable portions of the table.

In some embodiments, the database catalog contains one or more of such context aware access controls.

Some embodiments may, further, certify whether an identified applicable context-aware access control is to be applied to the request.

The request for access may include a request for a specific row or column or range of tables.

A list of unrestricted columns may be printed in response to the request, as a result of the context-aware access control.

In some embodiments, conditions of the context-aware access control are satisfied by data in the database.

In a third aspect of the disclosure, there is provided a computer program product for implementing context-aware access control of data in a relational database system. The computer program product may include a computer-readable storage medium having computer-readable program code embodied therewith. The computer-readable program code may be configured to perform the above method.

The computer program product includes a series of computer-readable instructions, which may be, for example: fixed on a tangible medium, such as a computer readable medium, which may be an optical disk, magnetic disk, solid-state drive, or transmittable to a computer system; accessible using a modem or other interface device; over either a tangible medium, including but not limited to optical or analogue communications lines; or accessible using wireless techniques, including but not limited to microwave, infrared, or other transmission techniques. The series of computer readable instructions embodies all or part of the functionality previously described.

Those skilled in the art will appreciate that such computer readable instructions can be written in a number of programming languages for use with many computer architectures or operating systems. Further, such instructions may be stored using any memory technology, present or future, including but not limited to semiconductor, magnetic, or optical. Such instructions may be transmitted using any communications technology, present or future, including but not limited to optical, infrared, or microwave. It is contemplated that such a computer program product may be distributed as a removable medium with accompanying printed or electronic documentation and may be, for example, shrink-wrapped software that is pre-loaded with a computer system, for example, on a system ROM or fixed disk, or distributed from a server or electronic bulletin board over a network, such as the Internet or World Wide Web.

In a fourth aspect of the disclosure, there is provided a computer program stored on a computer readable medium and loadable into the internal memory of a computer. The computer program may include software code portions, when the program is run on a computer, for performing all aspects of the above method.

In a fifth aspect of the disclosure, there is provided a data carrier aspect of the adaptive access control system 100 including functional computer data structures that, when loaded into a computer system and operated upon thereby, enable the computer system to perform all aspects of the above method. A suitable data carrier could be a solid-state memory, magnetic drive, or optical disk. Channels for the transmission of data may include storage media of all descriptions, as well as signal-carrying media, such as wired or wireless signal-carrying media.

It will be clear to one skilled in the art that many improvements and modifications can be made to the foregoing exemplary embodiment without departing from the scope of this disclosure.

What is claimed is:

1. A system for implementing context-aware access control of data in a relational database system, the system comprising:
    a memory having computer readable instructions; and
    one or more processors for executing the computer readable instructions, the computer readable instructions comprising:
        receiving from a user a request in a current context to access one or more tables of a database;
        determining that a static access control restricts access by the user to at least a portion of the one or more tables;
        identifying a context-aware access control defined for the at least a portion of the one or more tables, wherein the context-aware access control defines one or more exceptions in which the at least a portion of the one or more tables is accessible when the static access control restricts access to the at least a portion of the one or more tables;
        verifying that the current context of the request satisfies the one or more exceptions of the context-aware access control; and
        permitting access to the at least a portion of the one or more tables in reply to the request, responsive to verifying that the current context of the request satisfies the one or more exceptions of the context-aware access control.

2. The system according to claim 1, wherein the request lacks access to the one or more tables according to the static access control by virtue of at least one of a security level of the request and a request originator.

3. The system according to claim 1, the computer readable instructions further comprising:
    generating a pseudo-view object for the at least a portion of the one or more tables, responsive to permitting access, wherein the pseudo-view object lacks the static access control restricting access by the user to the at least a portion of the one or more tables; and
    applying the request to the pseudo-view object.

4. The system according to claim 3, the computer readable instructions further comprising replacing each reference to a restricted portion of a table, of the one or more tables in the request, with a reference to the pseudo-view object for the at least a portion of the one or more tables.

5. The system according to claim 1, wherein a database catalog of the database comprises the context-aware access control.

6. The system according to claim 1, wherein the request comprises a request for at least one of a specific row of the one or more tables and a specific column of the one or more tables.

7. The system according to claim 1, wherein one or more conditions of the context-aware access control are satisfied by data in the database.

8. A computer-implemented method for context-aware access control of data in a relational database system, the method comprising:
    receiving from a user a request in a current context to access one or more tables of a database;
    determining that a static access control restricts access by the user to at least a portion of the one or more tables;
    identifying a context-aware access control defined for the at least a portion of the one or more tables, wherein the context-aware access control defines one or more exceptions in which the at least a portion of the one or more tables is accessible when the static access control restricts access to the at least a portion of the one or more tables;
    verifying, by a computer processor, that the current context of the request satisfies the one or more exceptions of the context-aware access control; and
    permitting access to the at least a portion of the one or more tables in reply to the request, responsive to verifying that the current context of the request satisfies the one or more exceptions of the context-aware access control.

9. The method according to claim 8, wherein the request lacks access to the one or more tables according to the static access control by virtue of at least one of a security level of the request and a request originator.

10. The method according to claim 8, further comprising:
    generating a pseudo-view object for the at least a portion of the one or more tables, responsive to permitting access, wherein the pseudo-view object lacks the static access control restricting access by the user to the at least a portion of the one or more tables; and
    applying the request to the pseudo-view object.

11. The method according to claim 10, further comprising replacing each reference to a restricted portion of a table, of the one or more tables in the request, with a reference to the pseudo-view object for the at least a portion of the one or more tables.

12. The method according to claim 8, wherein a database catalog of the database comprises the context-aware access control.

13. The method according to claim 8, wherein the request comprises a request for at least one of a specific row of the one or more tables and a specific column of the one or more tables.

14. The method according to claim 8, wherein one or more conditions of the context-aware access control are satisfied by data in the database.

15. A computer program product for context-aware access control of data in a relational database system, the computer program product comprising a non-transitory computer readable storage medium having program instructions embodied therewith, the program instructions executable by a processor to cause the processor to perform a method comprising:
    receiving from a user a request in a current context to access one or more tables of a database;
    determining that a static access control restricts access by the user to at least a portion of the one or more tables;
    identifying a context-aware access control defined for the at least a portion of the one or more tables, wherein the context-aware access control defines one or more exceptions in which the at least a portion of the one or more tables is accessible when the static access control restricts access to the at least a portion of the one or more tables;

verifying that the current context of the request satisfies the one or more exceptions of the context-aware access control; and permitting access to the at least a portion of the one or more tables in reply to the request, responsive to verifying that the current context of the request satisfies the one or more exceptions of the context-aware access control.

16. The computer program product according to claim 15, wherein the request lacks access to the one or more tables according to the static access control by virtue of at least one of a security level of the request and a request originator.

17. The computer program product according to claim 15, the method further comprising:

generating a pseudo-view object for the at least a portion of the one or more tables, responsive to permitting access, wherein the pseudo-view object lacks the static access control restricting access by the user to the at least a portion of the one or more tables;

applying the request to the pseudo-view object; and replacing each reference to a restricted portion of a table, of the one or more tables in the request, with a reference to the pseudo-view object for the at least a portion of the one or more tables.

18. The computer program product according to claim 15, wherein a database catalog of the database comprises the context-aware access control.

19. The computer program product according to claim 15, wherein the request comprises a request for at least one of a specific row of the one or more tables and a specific column of the one or more tables.

20. The computer program product according to claim 15, wherein one or more conditions of the context-aware access control are satisfied by data in the database.

* * * * *